Figure 1:
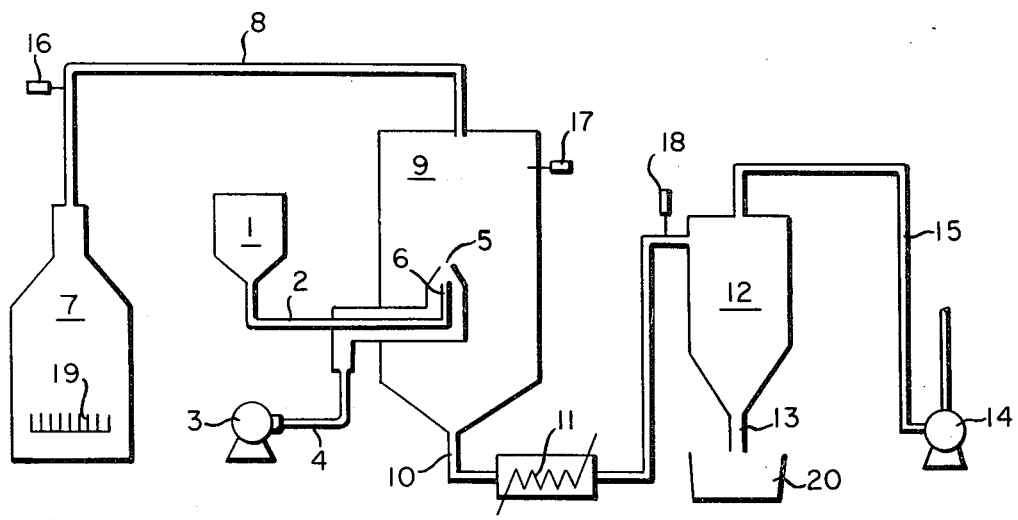

United States Patent [19]
Saito et al.

[11] 3,953,412
[45] Apr. 27, 1976

[54] SINTERED MICRO-POWDER OF TETRAFLUOROETHYLENE POLYMERS

[76] Inventors: Takumi Saito, No. 2016 Komagoe; Shigeki Hayashi, No. 5-34 Mukaida-cho, both of, Shimizu, Shizuoka, Japan

[22] Filed: Nov. 20, 1974

[21] Appl. No.: 525,669

Related U.S. Application Data

[62] Division of Ser. No. 384,504, Aug. 1, 1973.

[30] Foreign Application Priority Data

Aug. 9, 1972 Japan .............................. 47-79104

[52] U.S. Cl. ............................. 526/247; 260/42.18; 260/42.22; 260/42.24; 260/42.49; 260/92; 526/250; 526/253; 526/255; 264/14

[51] Int. Cl.² ...................... C08F 6/14; C08F 6/24

[58] Field of Search ................. 260/92.1 S, 87.5 A; 450/765, 718.5, 722.5

[56] References Cited
UNITED STATES PATENTS

| | | | |
|---|---|---|---|
| 2,202,481 | 5/1940 | Cox et al. .............................. | 260/2 |
| 2,946,763 | 7/1960 | Bro et al. .............................. | 260/45.5 |
| 3,087,921 | 4/1963 | Mathews et al. ..................... | 260/92.1 |
| 3,142,665 | 7/1964 | Cardinal et al. ..................... | 260/92.1 |
| 3,527,857 | 9/1970 | Fitz ..................................... | 264/117 |
| 3,528,955 | 9/1970 | Lippman ............................. | 260/92.1 |
| 3,532,782 | 10/1970 | Hartwimmer ....................... | 264/117 |
| 3,640,984 | 2/1972 | Miller ................................. | 260/92.1 |
| 3,655,611 | 4/1972 | Mueller et al. ...................... | 260/41 |

*Primary Examiner*—Stanford M. Levin

[57] ABSTRACT

Sintered micro-powder of tetrafluoroethylene polymer having an average particle size of 100 microns or less, a sphere factor of 1.2 or less, a specific gravity of 2.20 or less, and a weight loss on heating of 0.5 percent or less. The process for the preparation thereof comprising atomizing an aqueous dispersion containing 5 to 80 percent by weight of tetrafluoroethylene polymer particles having 0.05 to 0.5 micron average particle size into a gas at a temperature above the melting point of the tetrafluoroethylene polymer and recovering the sintered micro-powder.

22 Claims, 1 Drawing Figure

SINTERED MICRO-POWDER OF TETRAFLUOROETHYLENE POLYMERS

This is a division of application Ser. No. 384,504, filed Aug. 1, 1973.

BACKGROUND OF THE INVENTION

I. Field of the Invention

The present invention relates to novel spheriodal sintered micro-powders. More specifically, the present invention relates to spheroidal sintered micro-powder of tetrafluoroethylene polymers.

II. Prior Art

Tetrafluoroethylene polymers are widely used in chemical, mechanical, electrical and other industries because of excellent heat resistance, chemical resistance, and electrical properties.

Polytetrafluoroethylene has been developed for two purposes: (a) as powder to be used for molding and extrusions for which high tensile strength, low gas permeability and high dielectric strength are required and (b) as powder to be used as a lubricant.

To produce he polytetrafluoroethylene to be used for the former purpose, there are two known methods: (1) pulverization of coarse polytetrafluoroethylene particles obtained by suspension (granular) polymerization with a grinder such as a Hurricane mill; and (2) coagulation by stirring of the $0.1-0.5\mu$ polytetrafluoroethylene particles of the dispersion made by emulsion polymerization.

However, the powder produced by the method mentioned in (1) above is fibrous and of an irregular shape which is highly apt to lump, while the powder produced by the method (2) is highly apt to become fibrous when even a low shearing force is applied, thus both being difficult to handle.

A cold impact process is known as a method to improve the handling property of granular molding powder, in which polytetrafluoroethylene is pulverized at a low temperature. Though the powder produced in this process is excellent in its handling property, it is of an irregular shape and comparatively large, being usually $20\mu$ or larger in average particle size. Thus, the powder is not necessarily satisfactory for the purpose of powder lubrication or for dispersion in resins such as phenolic resin or solvents as intended by the present invention.

With such mechanical crushing methods as stated above, it was found difficult to obtain polytetrafluoroethylene powder having a desirable property for use as a powder for molding and lubricating.

To produce polytetrafluoroethylene powder to be used for the latter purpose, i.e., as a lubricant, there are two known methods: (1) a method in which polytetrafluoroethylene having a high molecular weight is thermally cracked at 400°C. or higher and then pulverized; and (2) a method in which polytetrafluoroethylene having a high molecular weight is irradiated with high energy radiation and then pulverized.

With these methods it is possible to produce a finely-pulverized powder, but the heat resistance, one of the important properties of the said resin, is made worse due to the serious deterioration of polytetrafluoroethylene, i.e., the rupture of molecular chains. Moreover, the powder is of an irregular shape.

An object of the present invention is to obtain a micro-powder to be used for molding and lubricating by other than a conventional mechanical cutting method. Other objects will become apparent from the disclosure that follows.

SUMMARY OF THE INVENTION

Now, in accordance with the invention sintered micro-powders of tetrafluoroethylene polymer have been discovered which are characterized by an average particle size of $100\mu$ or less (preferably less than $50\mu$), a sphere factor of 1.2 or less (preferably 1.15 or less), a specific gravity of 2.20 or less (preferably 2.18 or less), and a weight loss on heating of 0.5 percent or less (preferably less than 0.3 percent). The micro-powders of this invention are further characterized by a specific surface area of less than 4 $m^2$/gram (preferably less than 1.5 $m^2$/gram), and above 90 percent sintered (preferably 100 percent sintered) as measured by differential thermal analysis. The process of preparing the micro-powders of this invention comprises atomizing an aqueous dispersion containing 5 to 80 percent by weight (preferably 20 to 65 percent) of tetrafluoroethylene polymer particles having $0.05-0.5\mu$ average particle size into a gas at a temperature above the melting point of the tetrafluoroethylene polymer, thereby causing the particles to coalesce and sinter and recovering the sintered micro-powders of tetrafluoroethylene polymer.

For the present invention, the analytical measurements are made as follows:

A small amount of sample is placed on a glass slide, dispersed into a single layer by shaking slightly, and then photomicrographed. On a print, the largest and shortest diameters ($a$ and $b$) of each particle are accurately measured, using more than 300 particles selected at random. The average particle size is calculated as follows:

$$\text{Average particle size} = \frac{1}{n} \Sigma \frac{(a_i + b_i)}{2}, (i = 1,2,3.... n).$$

The sphere factor is calculated as follows:

$$\text{Sphere factor} = \frac{1}{n} \Sigma \left(\frac{a_i}{b_i}\right), (i = 1,2,3.... n).$$

The specific gravity of polytetrafluoroethylene sintered micro-powders of tetrafluoroethylene polymers are measured with a pycnometer, using trichloroethylene at 23°C.

The weight loss on heating is a value indicating the degree of deterioration of the tetrafluoroethylene polymer, and the higher the value, the greater is the degree of deterioration. It is measured as follows for non-melt-fabricable tetrafluoroethylene polymers:

A 5 gram sample is put into a 6.45 $cm^2$ metal mold and molded at a pressure of 70 $kg/cm^2$. After preliminary heating for an hour at 300°C., it is cooled to room temperature and weighed to obtain value $W_1$. Then the said sample is heated for 10 hours at 380° ± 2°C., and is cooled to room temperature and weighed to obtain value $W_2$. Calculation is:

$$\text{Weight loss on heating} = \frac{W_1 - W_2}{W_1} \times 100$$

The weight loss for melt-fabricable copolymers is determined as above except by heating for 30 minutes at 380° ± 2°C. under a pressure of 10 mm/Hg absolute.

Differential thermal analysis is used to measure percent sintered. This is based on the fact that sintered polytetrafluoroethylene (PTFE) is about 50 percent crystalline and melts at about 327°C. and unsintered PTFE is almost 100 percent crystalline and melts at about 340°C. a 4 mm sample tube is used and the heating rate is 5°C./minute. Extend the baseline before the first peak and measure the depth to the nearest 0.1 mm, calling this $d_1$. Extend the baseline after the second peak and measure the depth to the nearest 0.1 mm, calling this $d_2$.

$$\text{Percent sintered} = \left(\frac{2 \times d_1}{(2 \times d_1)+d_2}\right) \times 100.$$

The term apparent density as used herein is a value obtained by a procedure described in ASTM D-1457-62-T, now known as ASTM D-1457-69 without separating and reconstructing the sample.

Thus, in accordance with the invention an aqueous dispersion containing polytetrafluoroethylene particles having 0.05–0.5μ particle size, 5–80 percent by weight total solids (preferably 20–65 percent by weight total solids), obtained by emulsion polymerization, was prepared optionally adding a surface active agent after polymerization. The addition of a surface active agent is effective for the stabilization of the dispersion, and it is desirable to use a nonionic surface active agent. The concentration of dispersion is not critical, but if it is more than 80 percent by weight, the dispersion becomes unstable and polytetrafluoroethylene particles dispersed therein are apt to coagulate, while if it is less than 5 percent by weight, the heat load is large, which is economically unfavorable.

It is possible to add a filler such as a glass powder, molybdenum disulfide powder, graphite powder, bronze powder or a pigment into the above polytetrafluoroethylene aqueous dispersion.

The tetrafluoroethylene polymer of the present invention may be a homopolymer of tetrafluoroethylene, a nonmelt-fabricable copolymer of tetrafluoroethylene with a minor proportion of another copolymerizable ethylenically unsaturated monomer, a melt-fabricable copolymer of tetrafluoroethylene and hexafluoropropylene as disclosed in U.S. Pat. No. 2,946,763, or a copolymer of tetrafluoroethylene and a perfluorovinyl ether as disclosed in U.S. Pat. No. 3,132,123, said patents hereby incorporated by reference.

The copolymers disclosed in U.S. Pat. No. 2,946,763 have a specific melt viscosity, as measured at 380°C. under a shear stress of 6.5 pounds per square inch, of $1.5 \times 10^3$ to $3 \times 10^5$ poises; a specific I.R. ratio, as measured on film of about 2 mil thickness water-quenched from the molten product, by net absorbance at 10.18μ wave length divided by net absorbance at 4.25μ wave length, in the range of 1.5 to 6, which ratio is at least equal to the difference between 12.26 and the product of 1.96 and the common logarithm of the said specific melt viscosity; and a specific volatile content, as measured by weight loss during 30 minutes at 380°C. under a pressure of 10 mm/Hg absolute, of less than 0.3 percent.

The copolymers disclosed in U.S. Pat. No. 3,132,123 include copolymers of perfluoroalkyl perfluorovinyl ethers with tetrafluoroethylene, wherein said ether has the formula $C_nF_{2n+1}$—O—CF=CF$_2$, where $n$ is a number from 1 to 5, inclusive.

The tetrafluoroethylene polymer of the present invention as recited above may be a homopolymer of tetrafluoroethylene or may be a nonmelt-fabricable copolymer of tetrafluoroethylene with a minor proportion of another copolymerizable ethylenically unsaturated monomer. For example, the homopolymer can include small amounts of comonomer modifier, wherein the homopolymer still retains its nonmelt-fabricable character, such as up to 2 percent by weight of polymer units derived by copolymerization with tetrafluoroethylene of perfluoroalkyl- or perfluoroalkoxy-trifluoroethylene of 3 to 10 carbon atoms, and preferably hexafluoropropylene, as disclosed in U.S. Pat. No. 3,142,665 to Cardinal, Edens and Van Dyk.

Thus, for example, a polytetrafluoroethylene aqueous dispersion is atomized, usually through nozzles, into the atmosphere of a sintering chamber at the temperature of the melting point or higher, where moisture and surface active agent (if it is added) are instantly vaporized and the fine particles are coalesced and sintered into polytetrafluoroethylene sintered micro-powder.

For atomization, any means that can distribute the fine drops of the said aqueous dispersion evenly in a hot gas may be used, for example, binary fluid nozzle, high pressure nozzle, rotary spraying plate or the like. Especially, a binary fluid nozzle is preferable because of less effect upon polytetrafluoroethylene particles, i.e., less shearing force is applied to the fine particles as compared with a rotary spraying plate. As to the temperature in the sintering chamber, it is necessary to keep it higher than the melting point in order to sinter the polytetrafluoroethylene particles in a short period of time. If it is lower than the said temperature, a large fraction of the particles will remain unsintered, thus worsening the handling property of the powder. The particle size of sintered micro-powder formed is greatly affected by the construction of the nozzle, pressure of primary air and feed speed of fluid. Therefore, it is possible to produce polytetrafluoroethylene sintered micro-powder having a given particle size by changing the nozzle and the pressure of primary air.

Also, it is possible to change the particle size by controlling the concentration and viscosity of dispersion, but it is not possible to produce such micro-powders having average particle sizes from 0.1$\mu$ to 100$\mu$ with a single nozzle design.

Lastly, polytetrafluoroethylene micro-powder thus sintered is cooled to below the melting point, delivered to the recovery section and collected as product.

As recovery equipment a cyclone, a bag filter or the like is generally used, but the invention is not limited to them alone, but to any recovery equipment that can be used effectively.

FIG. 1 is the overall diagram of the polytetrafluoroethylene sintered micro-powder manufacturing equipment. The equipment is similar to the spray drying equipment used for the production of dried powder foods such as dry milk, but it must be designed to stand high temperatures, above the melting point of polytetrafluoroethylene.

Referring now to FIG. 1, the air compressed by primary air compressor 3 is sent through pipe 4 and atomized from binary fluid nozzle 5 into sintering chamber 9. By dint of the suction at the nozzle, polytetrafluoroethylene dispersion in tank 1 is caused to flow through pipe 2 and nozzle 5 into chamber 9. At the tip of the nozzle, the primary air separates into fine fluid drops the fluid stream from nozzle 6. On the other hand, the secondary air heated in heater 7 with gas burner 19 is sent through pipe 8 into the chamber 9. The pipe 8 and chamber 9 are insulated with asbestos. The fluid drops of the said dispersion atomized from the nozzle 5 are mixed with the highly heated secondary air in chamber 9; moisture is instantly evaporated from them at the temperature above the melting point of polytetrafluoroethylene and then dispersed solids are coalesced and sintered into polytetrafluoroethylene sintered micropowder.

The sintered micro-powder is delivered through pipe 10 into cooling chamber 11, cooled to a temperature below the melting point, sent into cyclone 12 and then collected from outlet 13. Exhaust gas is exhausted by exhaust blower 14 through pipe 15 into the atmosphere. The temperature in this equipment is measured by thermocouple 16 fitted in the secondary air pipe, thermocouple 17 at the top of the sintering chamber 9 and thermocouple 18 at the inlet of the cyclone.

If the polytetrafluoroethylene sintered micro-powder produced in accordance with the present invention is mixed with synthetic resin such as phenolic resin, polycarbonate resin, acetal resin or elastomer, the fatigue resistance and wear resistance of the said resin are improved and the coefficient of friction is reduced. Also, by adding the powder, lubricating oil or grease can be improved in its lubricating property at low temperature. The powder is also useful for molding.

The following examples are illustrative of the present invention.

EXAMPLE 1

Aqueous dispersion containing 35 percent by weight of polytetrafluoroethylene obtained by the emulsion polymerization of tetrafluoroethylene was subjected to the treatment described hereinbefore in FIG. 1. The average particle size of polytetrafluoroethylene particles contained in the aqueous dispersion $0.20\mu$ and its specific gravity measured in accordance with ASTM-D-1457 and 2.205. In order to measure standard specific gravity, the sample was coagulated by stirring, separated, and dried well below the sintering temperature. Then a specimen was molded according to ASTM-D-1457-66 except for the sample weight (12.0 grams) and the heating and cooling rate. The sintering oven was heated from 290 to 380°C. at 2°C./minute. After the specified 30 minutes at 380°C., the oven was cooled to 294°C. at 1°C./minute and held at 294°C. for 1 minute, after which the specimen was removed from the oven and cooled to room temperature and the specific gravity was determined as in ASTM-D-1457-66. The dried powder coagulated from the starting dispersion had a specific surface area of 9.6 m²/gram.

Then, after starting the exhaust blower, the gas burner in the heater was ignited to heat the sintering chamber. Next, after starting the primary air compressor, the dispersion was atomized from the binary fluid nozzle while controlling the flow rate. The conditions of production and the properties of the powder collected from the cyclone are shown in column 1 in Table 1.

EXAMPLE 2

To the same polytetrafluoroethylene aqeuous dispersion as in case of Example 1 above 1 percent by weight (based on polytetrafluoroethylene) of surface active agent (Triton X-100) was added. The dispersion thus prepared was atomized under the conditions shown in column 2 in Table 1.

The properties of the powder thus obtained are as shown in column 2 in Table 1.

EXAMPLE 3

To adjust to pH 9.5, aqueous ammonium hydroxide was added to the same dispersion as in Example 1 above, then 6 percent by weight (based on polytetrafluoroethylene) of Triton X-100

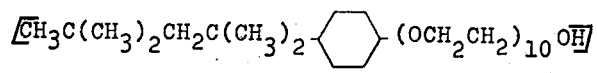

was added to concentrate the dispersion to 60 percent by weight. The dispersion thus prepared was atomized under the conditions shown in column 3 in Table 1.

The properties of the powder thus obtained are as shown in column 3 in Table 1.

EXAMPLES 4–7

Sixty percent by weight polytetrafluoroethylene aqueous dispersion stated in Example 3 above was atomized under the conditions shown in columns 4–7 in Table 1, respectively.

The properties of the powder thus obtained are as shown in columns 4–7 in Table 1, respectively.

Table 1

| Sintering Condition | 1 | 2 | 3 | 4 | 5 | 6 | 7 |
| --- | --- | --- | --- | --- | --- | --- | --- |
| Temp. in Secondary air pipe, °C. | 690 | 670 | 650 | 650 | 600 | 600 | 600 |
| Temp. in sintering chamber, °C. | 380 | 360 | 330 | 330 | 330 | 330 | 330 |
| Temp. at inlet of cyclone, °C. | 320 | 290 | 290 | 290 | 290 | 290 | 290 |
| Atomizing Condition | | | | | | | |
| Pres. of primary air, kg/cm² | 5 | 2.5 | 2.5 | 5 | 0.5 | 0.25 | 0.12 |
| Diameter of nozzle, mm | 3 | 3 | 3 | 2 | 1 | 1 | 1 |
| Feed speed of fluid, kg/h | 6.5 | 6.0 | 13 | 17 | 0.7 | 0.4 | 0.6 |
| Concentration of dispersion, wt percent | 35 | 35 | 60 | 60 | 60 | 60 | 60 |
| Properties of Powder | | | | | | | |
| Average particle size, $\mu$ | 1.9 | 2.4 | 4.3 | 3.3 | 17.4 | 35.7 | 45.7 |
| Sphere factor | 1.15 | 1.15 | 1.14 | 1.07 | 1.05 | 1.05 | 1.06 |

Table 1-continued

| Sintering Condition | 1 | 2 | 3 | 4 | 5 | 6 | 7 |
|---|---|---|---|---|---|---|---|
| Specific gravity | 2.16 | 2.16 | 2.17 | 2.17 | 2.18 | 2.18 | 2.17 |
| Weight loss on heating, percent | 0.26 | 0.23 | 0.16 | 0.21 | 0.19 | 0.18 | 0.14 |
| Apparent density, g/ml | 0.39 | 0.44 | 0.52 | 0.47 | 0.64 | 0.79 | 0.86 |
| Specific surface area by $N_2$ adsorption, $m^2/gr$ | 1.4 | 1.3 | 0.9 | 1.2 | 0.21 | 0.17 | 0.14 |
| Sintered, percent | 100 | 100 | 100 | 100 | 100 | 100 | 100 |

EXAMPLE 8

Using the same equipment and the procedure of Example 1, an aqueous dispersion of a melt-fabricable copolymer of hexafluoropropylene and tetrafluoroethylene designated FEP prepared according to the teaching in U.S. Pat. No. 2,946,763 was diluted to 40 weight percent solids and the following conditions were used to prepare a micro-powder. The properties of the micro-powder produced are described in the following Table.

| Sintering Condition | |
|---|---|
| Temp. in secondary air pipe, °C. | 520 |
| Temp. in sintering chamber, °C. | 300 |
| Temp. at inlet of cyclone, °C. | 250 |
| Atomizing Condition | |
| Pres. of primary air, $kg/cm^2G$ | 0.5 |
| Diameter of nozzle, mm | 0.8 |
| Feed speed of fluid, kg/h | 0.6 |
| Concentration of dispersion, wt. percent | 40 |
| Properties of Powder | |
| Average particle size, $\mu$ | 11.0 |
| Sphere factor | 1.02 |
| Specific gravity | 2.156* |
| Weight loss on heating, percent | 0.17 |
| Apparent density, g/ml | 0.80 |
| Specific surface area by $N_2$ adsorption, $m^2/gr$ | 0.29 |

*Specific gravity was measured by hot pressing 3.5 grams of powder at 300°C. and 1000 psi and then cooling to room temperature in the mold and removing from the mold in the form of chips and following the standard specific gravity (SSG) procedure described herein for polytetrafluoroethylene.

The resultant sintered micro-powder was highly spherical. The starting dispersion need not be diluted to 40 weight percent solids to prepare the micro-powder of the invention.

The specific gravity and specific surface area of the FEP powder merely coagulated from the starting dispersion were 2.152 and 13.4 $m^2/g$ respectively.

Comparative Examples A through H

The properties of commercial polytetrafluoroethylene sintered powders are shown in Table 2. Comparative examples A through E represent polytetrafluoroethylene sintered powders useful as a powder lubricant believed to be prepared by a method in which polytetrafluoroethylene having a high molecular weight is thermally cracked at 400°C. or higher and then pulverized or in which polytetrafluoroethylene having a high molecular weight is irradiated with high energy radiation and then pulverized. Comparative examples F through H represent polytetrafluoroethylene presintered powders useful as a molding material believed to be prepared by sintering at a temperature between the melting point of polytetrafluoroethylene and 380°C. followed by pulverization.

Table 2

| Properties of Powder | Unit | PTFE Sintered Powder for Lubrication | | | | | PTFE Presintered Powder for Moulding | | |
|---|---|---|---|---|---|---|---|---|---|
| | | A | B | C | D | E | F | G | H |
| Average particle size | $\mu$ | 23.0 | 9.9 | 81.6 | 3.4 | fibrous | 420 | 355 | 570 |
| Sphere factor | | 3.6 | 2.0 | 1.68 | 1.69 | fibrous | 1.58 | 1.76 | 1.46 |
| Specific gravity | | 2.22 | 2.25 | 2.30 | 2.22 | 2.25 | 2.17 | 2.17 | 2.18 |
| Weight loss on heating | % | 0.89 | 1.43 | 1.15 | 3.63 | 2.36 | 0.01 | 0.03 | 0.01 |
| Apparent density | g/ml | 0.39 | 0.54 | 0.35 | 0.48 | 0.21 | 0.64 | 0.74 | 0.53 |
| Specific surface area by $N_2$ adsorption | $m^2/g$ | 0.7 | 1.0 | 3.3 | 7.5 | 4.7 | 0.38 | 0.13 | 0.54 |
| Sintered | % | 100 | 100 | 100 | 100 | 100 | 100 | 92 | 100 |

The spheroidal sintered micro-powders of the invention are useful as lubricants, mold release agents, powder coatings and other uses requiring a low coefficient of friction.

The foregoing detailed description has been given for clarity of understanding and no unnecessary limitations are to be understood therefrom. The invention is not limited to exact details shown and described for obvious modifications will occur to those skilled in the art.

What is claimed is:

1. Sintered micro-powder of tetrafluoroethylene polymer wherein the polymer is the homopolymer of tetrafluoroethylene, made by emulsion polymerization of tetrafluoroethylene, a non-melt fabricable copolymer of tetrafluoroethylene with a copolymerizable ethylenically unsaturated monomer or a melt-fabricable copolymer of tetrafluoroethylene and hexafluoropropylene or a perfluorovinyl ether, said sintered micro-powder characterized in that the average particle size is between $1.9\mu$ and $100\mu$, sphere factor is less than 1.2, specific gravity is less than 2.20, and weight loss on heating is less than 0.5%.

2. The micro-powder of claim 1 wherein the tetrafluoroethylene polymer is polytetrafluoroethylene.

3. The micro-powder of claim 2 wherein the average particle size is less than $50\mu$.

4. The micro-powder of claim 2 wherein the sphere factor is 1.15 or less.

5. The micro-powder of claim 2 wherein the specific gravity is 2.18 or less.

6. The micro-powder of claim 2 wherein the weight loss on heating is less than 0.3%.

7. The micro-powder of claim 1 wherein the tetrafluoroethylene polymer is a copolymer of tetrafluoroethylene with up to 2% by weight of polymer units derived by copolymerization with perfluoroalkyl- or perfluoroalkoxy-trifluoroethylene of 3 to 10 carbon atoms.

8. The micro-powder of claim 7 wherein the average particle size is less than $50\mu$.

9. The micro-powder of claim 7 wherein the sphere factor is 1.15 or less.

10. The micro-powder of claim 7 wherein the specific gravity is 2.18 or less.

11. The micro-powder of claim 7 wherein the weight loss on heating is less than 0.3%.

12. The micro-powder of claim 7 wherein the tetrafluoroethylene polymer is a copolymer of tetrafluoroethylene and hexafluoropropylene.

13. The micro-powder of claim 1 wherein the tetrafluoroethylene polymer is a copolymer of tetrafluoroethylene and hexafluoropropylene having a specific melt viscosity, as measured at 380°C. under a shear stress of 6.5 pounds per square inch, of $1.5 \times 10^3$ to $3 \times 10^5$ poises, a specific I.R. ratio, as measured on film of about 2 mil thickness water-quenched from the molten product, by net absorbance at $10.18\mu$ wave length divided by net absorbance at $4.25\mu$ wave length, in the range of 1.5 to 6, which ratio is at least equal to the difference between 12.26 and the product of 1.96 and the common logarithm of the same specific melt viscosity, and a specific volatile content, as measured by weight loss during 30 minutes at 380°C. under a pressure of 10 mm./Hg absolute, of less than 0.3%.

14. The micro-powder of claim 13 wherein the average particle size is less than $50\mu$.

15. The micro-powder of claim 13 wherein the sphere factor is 1.15 or less.

16. The micro-powder of claim 13 wherein the specific gravity is 2.18 or less.

17. The micro-powder of claim 13 wherein the weight loss on heating is less than 0.3%.

18. The micro-powder of claim 1 wherein the tetrafluoroethylene polymer is a copolymer of tetrafluoroethylene and perfluorovinyl ether having the formula $C_nF_{2n+1}-O-CF=CF_2$, where $n$ is a number from 1 to 5 inclusive.

19. The micro-powder of claim 18 wherein the average particle size is less than $50\mu$.

20. The micro-powder of claim 18 wherein the sphere factor is 1.15 or less.

21. The micro-powder of claim 18 wherein the specific gravity is 2.18 or less.

22. The micro-powder of claim 18 wherein the weight loss on heating is less than 0.3%.

* * * * *